US010599689B2

(12) United States Patent
Kyte et al.

(10) Patent No.: US 10,599,689 B2
(45) Date of Patent: Mar. 24, 2020

(54) IDENTIFYING PARAMETER VALUES IN LOG ENTRIES

(71) Applicant: INTERNATIONAL BUSINESS MACHINES CORPORATION, Armonk, NY (US)

(72) Inventors: Adrian P. Kyte, Broadstone (GB); John D. Taylor, Eastleigh (GB); Joseph R. Winchester, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 15/797,215

(22) Filed: Oct. 30, 2017

(65) Prior Publication Data

US 2019/0130021 A1   May 2, 2019

(51) Int. Cl.
    *G06F 17/30*     (2006.01)
    *G06F 16/31*     (2019.01)
    *G06F 16/13*     (2019.01)
    *G06F 16/33*     (2019.01)

(52) U.S. Cl.
    CPC ............ *G06F 16/31* (2019.01); *G06F 16/13* (2019.01); *G06F 16/3344* (2019.01)

(58) Field of Classification Search
    CPC ....... G06F 16/31; G06F 16/3344; G06F 16/13
    USPC .................................................. 707/600–899
    See application file for complete search history.

(56) References Cited

U.S. PATENT DOCUMENTS

| 6,119,079 | A  | * | 9/2000  | Wang ..................... G06F 9/454 704/8 |
| 8,874,426 | B2 |   | 10/2014 | Williams |
| 9,176,840 | B2 |   | 11/2015 | Brodeur et al. |
| 9,384,112 | B2 |   | 7/2016  | Peterson et al. |
| 9,430,316 | B2 |   | 8/2016  | Narayanan |
| 2015/0149148 | A1 | | 5/2015 | Ramakrishnan et al. |
| 2016/0292263 | A1 | | 10/2016 | Ferrar |

OTHER PUBLICATIONS

Oracle, "12 Managing Log Files and Diagnostic Data," Fusion Middleware Administering Oracle Fusion Middleware, https://docs.oracle.com/middleware/1221/core/ASADM/logs.htm#ASADM215, Printed on Sep. 28, 2017, pp. 1-43.
Mell et al., "The NIST Definition of Cloud Computing," National Institute of Standards and Technology, U.S. Department of Commerce, Special Publication 800-145, Sep. 2011, pp. 1-7.

\* cited by examiner

*Primary Examiner* — Isaac M Woo
(74) *Attorney, Agent, or Firm* — Reza Sarbakhsh

(57) ABSTRACT

Method and system are provided for identifying parameter values in log entries from an application. The method includes receiving a log entry including language text and parameter values and referencing a localization language resource of the application that includes entry types in which translatable language text is distinguished from parameters for the purposes of language substitution for localization of the application. The method identifies an entry type in the localization language resource that corresponds to the log entry and analyzes the log entry with reference to the entry type to distinguish the parameter values from the translatable language text. The parameter values are then extracted from the log entry for analysis.

18 Claims, 6 Drawing Sheets

IDENTIFYING PARAMETER VALUES IN LOG ENTRIES

BACKGROUND

The present invention relates to processing log entries, and more specifically, to identifying parameter values in log entries.

Most computer systems generate log entries that are written to a log of some form. These entries are typically made up of a combination of language text and parameter values. For example, a log entry may include: a timestamp; a message code or identifier; and a text string with values inserted into it when the entry is generated which identify the specific resource(s) and/or state being reported on in the entry.

An example of this is the entry: "File PEN failed to open on 11/12/2016 with error code 2016".

This is created inside an application by taking the message: "File {1} failed to open on {2} with error code {3}" and substituting the arguments "PEN", "11/12/2016" and "2016" for the parameters.

Although an individual log entry can be read by an appropriately experienced person; the requirement is often to view changes over time, at which point reviewing the flat text file can be time consuming. There can be very useful information in these logs; however, their structure does not make it easy to find relevant information. In particular, it can be difficult to find relationships between entries scattered through the log.

The prior art involves parsing the log to determine areas that contain relevant information either manually or using software.

SUMMARY

According to an aspect of the present invention there is provided a computer-implemented method for identifying parameter values in log entries of an application, comprising: receiving a log entry including language text and parameter values; referencing a localization language resource of the application that includes entry types in which translatable language text is distinguished from parameters for the purposes of language substitution for localization of the application; identifying an entry type in the localization language resource that corresponds to the log entry; analyzing the log entry with reference to the entry type to distinguish the parameter values from the translatable language text; and extracting the parameter values from the log entry for analysis.

According to another aspect of the present invention there is provided a system for identifying parameter values in log entries of an application, comprising: a processor and a memory configured to provide computer program instructions to the processor to execute the function of components of the system; a log entry input component for receiving a log entry including language text and parameter values; a reference component for referencing a localization language resource of the application that includes entry types in which translatable language text is distinguished from parameters for the purposes of language substitution for localization of the application; an entry type component for identifying an entry type in the localization language resource that corresponds to the log entry; a parameter distinguishing component for analyzing the log entry with reference to the entry type to distinguish the parameter values from the translatable language text; and an extractor component for extracting the parameter values from the log entry for analysis.

According to a further aspect of the present invention there is provided a computer program product for identifying parameter values in log entries, the computer program product comprising a computer readable storage medium having program instructions embodied therewith, the program instructions executable by a processor to cause the processor to: receive a log entry including language text and parameter values; reference a localization language resource of the application that includes entry types in which translatable language text is distinguished from parameters for the purposes of language substitution for localization of the application; identify an entry type in the localization language resource that corresponds to the log entry; analyze the log entry with reference to the entry type to distinguish the parameter values from the translatable language text; and extract the parameter values from the log entry for analysis.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

Figure 1:
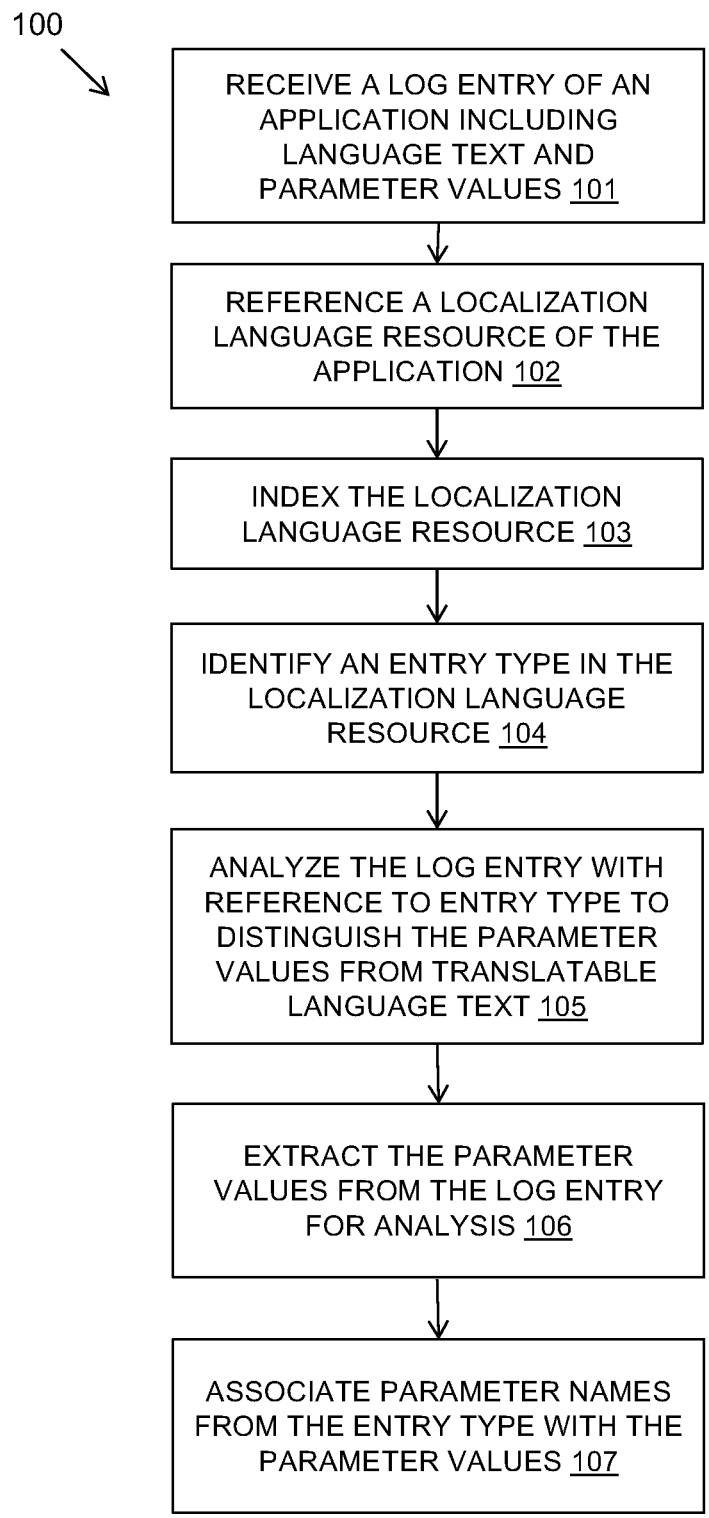
FIG. 1 is a flow diagram of an example embodiment of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system analyze log entries (also referred to as log messages) in a log file written by an application by looking up the entries in language bundles referenced by the application in order to distinguish parameter values from language text in the entries. The log entries may be records that log events that occur in runs of an operating system or software application that are written to a log file.

The log entries may conform to a predefined format including a combination of language text and parameter values. The log entries may also include a key to the entry or message type.

The application writing the log entries is provided with a localization language resource. Localization uses methods of transforming computer applications to different languages of a target audience, known as the locale. An application may be localized by translating user visible text that is externalized into resource bundles that are separate to the computer application code module. The text in the resource bundle is translated into different languages for different regions or locales where the application is operated. The application may load a locale-specific resource from the resource bundle that is appropriate for the locale. Application code may be written which is independent of the locale by isolating the locale-specific information in resource bundles. This allows the application code to be created and distributed independently of the resource bundles.

In the localization language resource, each entry type separates literals or language text that represents the user translatable portion from parameters that may have substitution variables. This is for the purpose of language translation of the entries into different language bundles for the language of the end user of the application. The localization language resource may hold the entry types in files with language prefixes that the application can load based on the language of the end user.

The entry types in the localization language resource are provided in a general format with the parameters in a pre-substitution form (formal parameters) in which the parameter values have not been entered in the parameter fields. The log entries in the log file are individual instances of the entry types with parameter values (actual parameters or arguments) entered. Therefore the log entries are post-substitution of variable content values.

Comparing the log entry of a running application with an entry type of a localization language resource enables the extraction of the parameter values of the log entry, which may then be processed. Once the parameter values have been identified, the log entries may be displayed in whatever manner is appropriate and the parameter values may be augmented to allow actions to be taken on them.

This method provides an effective way to augment flat log files to identify parameter values within the text, allowing indexing, highlighting, hyperlinks, statistics or other useful additional information about the contents of the log.

Referring to FIG. 1, a flow diagram 100 shows an example embodiment of the described method for identifying parameter values in log entries of an application.

One or more log entries may be received 101 for processing by the method. These may be in the form of an entire log file, individual log entries as they are recorded, or a selection of log entries. Log entries may include language text and parameter values. The parameter values may be difficult to distinguish from the language text as the parameter values themselves may contain text.

The application may have an associated localization language resource that may be referenced 102 by the method. The localization language resource, such as a language bundle, may include entry or message types in which translatable language text is distinguished from parameters for the purposes of language substitution for localization of the application.

The method may index 103 the localization language resource for easier processing of entry types by the method. There may be many entry types across many files. The location of the files and their names follows a pattern. For example, in Java (Java is a trade mark of Oracle Corporation), language files are provided in resource bundles in ".jar" files with the names ".nl" at the end and the files are named ".properties". For performance reasons, the method may read all of the files and index them for faster lookup.

The method may identify 104 an entry type in the localization language resource that corresponds to the received log entry. The method reads the log entry written by the application and looks up the entry types of the localization language resource known to the application to determine which entry type was used.

This may be carried out by using matching logic to match a log entry to an entry type in the localization language resource. The matching logic may be used to determine the match, as the lookup is from the post substitution entry to locate the language bundle's pre-substitution message. In some instances, a log entry may include an entry key that may be used to look up an entry type in the localization language resource.

The process to add parameters into the appropriate locations in a string from a localization language resource is straightforward matter of concatenating fragments of text, sometimes with conversion of non-string data types to strings; however, the reverse may be more complex. The matching logic may therefore be required to correctly match the log entry to the correct entry in the localization language resource. This may be done by matching the language text of the log entry to the translatable language text of an entry type in the localization language resource.

The method may analyze 105 the log entry with reference to the entry type to distinguish the parameter values from the translatable language text and extract 106 the parameter values from the log entry for analysis. In one embodiment, the parameter values may be captured in a side log using line numbers of the log file as a positional index for the parameter values.

A log entry instance with parameter values and an entry type with parameter fields but no entered values may be compared to extract the parameter values. This may be referred to as a post-substitution entry compared to a pre-substitution entry, where the substation refers to entering parameter values into a parameter field.

In some embodiments, the entry type of the localization language resource may include parameter names, which may be associated 107 with the extracted parameter values of the log entry.

In one example, log entries may be error messages with the explanation of the error provided in different languages as translatable language text for an end user of the application. An error message may be provided in different languages to an end user, such as:

"File {1} failed to open on {2} with error code {3}" in English (EN);

"Fichier {1} n'a pas réussi à ouvrir le {2} {3} avec le code d'erreur" in French (FR): and "文件{1} 未能打開{2} {3}, 錯誤代碼" in Chinese (ZH).

It can be seen from this example, that the language text in the different languages results in the parameters being in different places and possibly order in the message. Additionally, the parameter vales when inserted may themselves include language text, for example, identifying a resource, which makes it difficult to distinguish as a parameter value.

An error message in a log file may be: "File PEN failed to open on 11/12/2016 with error code 2016".

The localization language resource of file "messages" may be read by the application and a message with key "IX0040" may represent a file open failure. The message key and the value of the message may be a named pair, with the value being different for each language.

In English the file will be:
messages_en
IX0040=File {1} failed to open on {2} with error code {3}
In Chinese the file will be:
messages_ZH
IX0040= 文件 {1} 未能打開 {2} {3}, 錯誤代碼
In French the file will be:
messages_FR
IX0040=Fichier {1} n'a pas réussi à ouvrir le {2} {3} avec le code d'erreur The log message "File PEN failed to open on 11/12/2016 with error code 2016" is analyzed and compared against all of the known messages. Matching may be used to lookup the localization language resource's pre-substitution message.

"File {1} failed to open on {2} with error code {3}"

With the generalized entry type (of pre-substitution form with no parameter values) and the log entry instance (of post-substitution form with parameter values), the substituted parameter values may be extracted. For example, "PEN", "11/12/2016" and "2016" can be extracted as they represent the parameter values.

The analyzer may capture the parameter values in a side log using the line number of the log file as a positional index. This allows an application that is rendering or displaying the original log with the post-substituted values to have access to the raw values.

This is useful in the situation where the substituted values represent a hyperlink code that can be used. For example, the value PEN that is a file can be a hyperlink to search for resources with name PEN. In existing parsers that are just looking for phrases false positives may identify the word "open" or parts of the word and give false hyperlinks.

The method is also useful for searching where a user is looking for all messages that access the resource PEN as this can look up the values file to find which entries have PEN as substitution values and then use these to find the error messages.

The method is also useful for counting entries, for example the number of times the file PEN has been used in a log entry.

Existing solutions must look for the phrases that contain names of resources that are mixed in with language text.

The method could also be used to determine which messages are frequently used, and which appear less. This can be useful to determine where to write help and documentation for how to respond to messages or provide assistance to users to diagnose and resolve problems. It can also be used by operators to look for frequent issues that may need automation or tasks to respond to before they occur.

This method has an additional advantage in that, due to its implementation, it can be applied retrospectively to software products, with minimal additional work, and does not need the original log messages to be modified.

Figure 2:
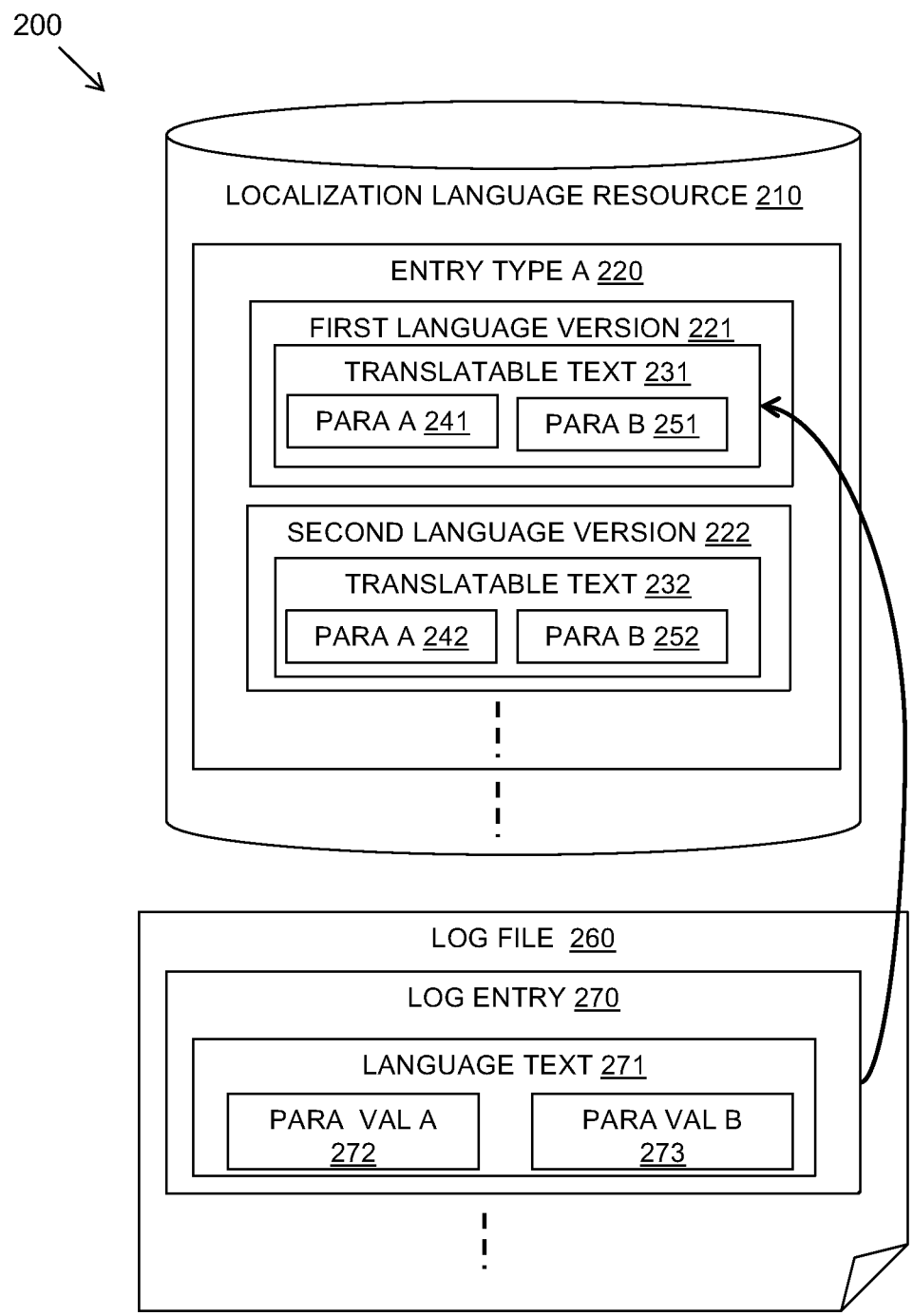
FIG. 2 is a schematic diagram illustrating a method in accordance with the present invention.

FIG. 2 shows a schematic diagram 200 representing the described method.

A localization language resource 210 is illustrated with an entry type A 220. For each entry type 220, multiple language versions 221, 222 may be provided including translatable text 231, 232 and parameters 241, 242; 251, 252.

In this schematic example, a first language version 221 of an entry type A 220 may include translatable text in the first language 231 and two parameters, parameter A 241 and parameter B 251. The parameters A and B 241, 251 may be provided within the context of the translatable text 231. A second language version 222 of the entry type A 220 may include translatable text in the second language 232 and the same two parameters, parameter A 242 and parameter B 252.

A log file 260 may include multiple log entries 270 each including language text 271 and parameter values 272, 273. A log entry 270 may be matched to an entry type 220 and the language text 271 distinguished from the parameter values 272, 273 by comparing the language text 271 to the translatable text 231 in the same language.

Two examples are shown using the same output message of:
"QWER1234 I 09/02/2016 22:23:33 ABE1223 Open file myfile.txt failed with return code 23".

Example 1

First example of a translatable resource:

```
<msg xml:lang="en-us" severity="I" number="QWER1234">
    <msgText>
        <varname format="char"
        modExit="1">date</varname>
        <varname format="char"
        modExit="2">time</varname>
        <varname format="char"
        modExit="3">systemid</varname> Open file<space/>
        <varname format="char"
        modExit="4">filename</varname> failed with return code<space/>
        <varname format="int"
        modExit="5">returncode</varname> .
    </msgText>
</msg>
```

The message with the parameters identified and underlined is as follows:
QWER1234 I 09/02/2016 22:23:33 ABE1223 Open file myfile.txt failed with return code 23.

In addition, from the translatable resource the parameter names are known:
message number=QEWR1234
severity=I
date=09/02/2016
time-22:23:33
systemid=ABE1223
filename=myfile.txt
returncode=23

Example 2

Second example of a translatable resource as a Java translatable resource:
QWER1234=QWER1234 I {0} {1} {2} Open file {3} failed with return code {4}.
Therefore, {0}=09/02/2016; {1}=22:23:33; {2}=ABE1223; {3}=myfile.txt; {4}=23.
The message with the parameters identified and underlined is as follows:
QWER1234 I 09/02/2016 22:23:33 ABE1223 Open file myfile.txt failed with return code 23.

In the case of the Java example, the parameters are identified but are not associated with parameter names. This processing of the log entry is also able to identify parameters in the log entries for post processing.

Figure 3:
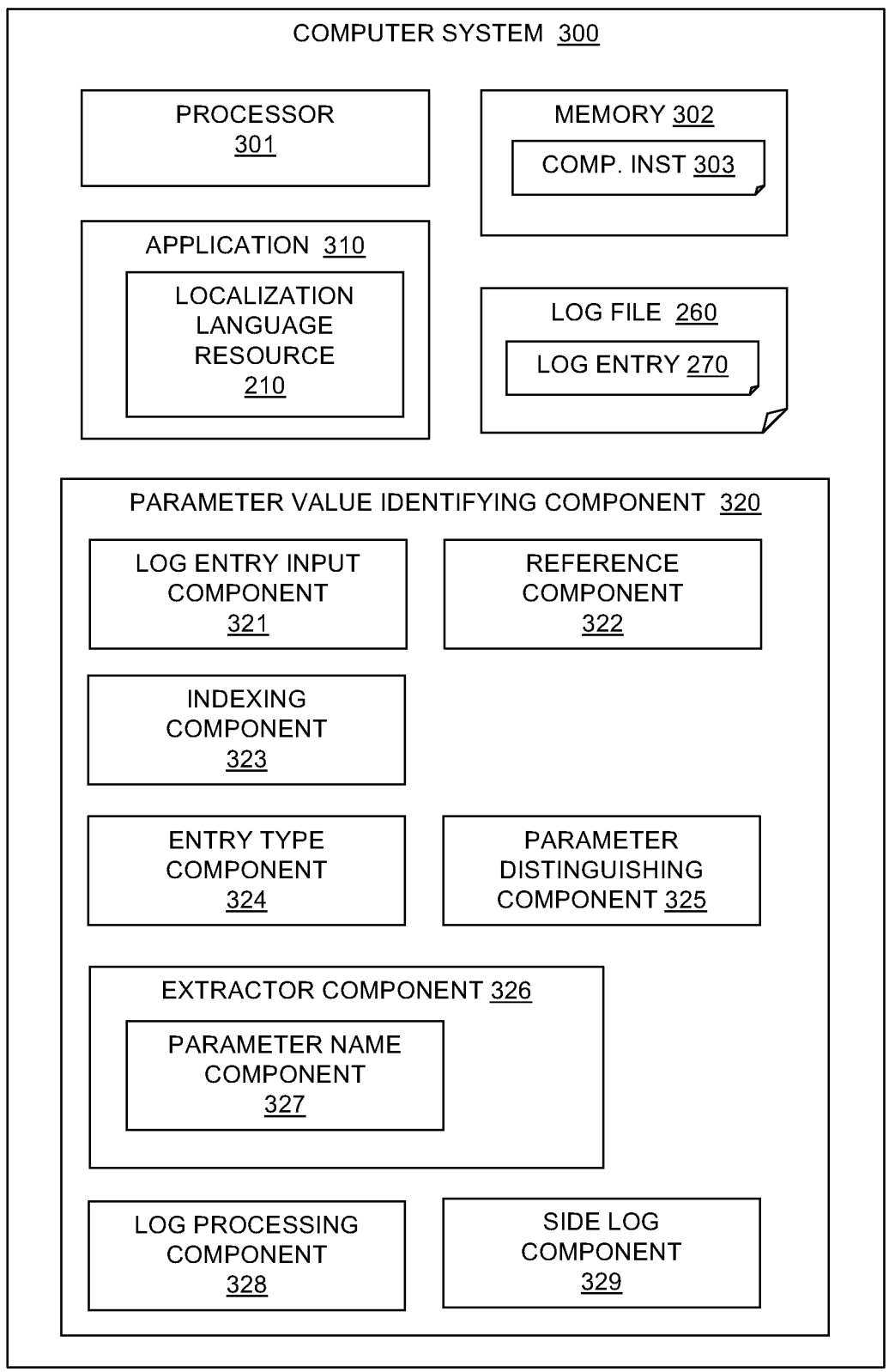
FIG. 3 is block diagram of an example embodiment of a system in accordance with the present invention.

FIG. 3 is a block diagram of an example embodiment of the described system. A computer system 300 is provided including a parameter value identifying component 320 for analyzing log entries 270 of a log file 260 of an application 310. The log file 260 may be separate from the application 310 and may be in the form of files on a file system written out by the application 310. The application 310 and log file 260 may be provided locally or remotely to the parameter value identifying component 320. The application 310 also has an associated localization language resource 210 that may also be provided locally or remotely to the application 310. In one embodiment, the localization language resource 210 may be deployed with the application 310 as part of an install process.

The computer system 300 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The parameter value identifying component 320 may include a log entry input component 321 for receiving a log entry of an application 310 including language text and parameter values. The log entry input component 321 may receive multiple log entries of a log file 260 of the application 310 for analysis of the parameter values in the log file 260.

The parameter value identifying component 320 may include a reference component 322 for referencing the localization language resource 210 of the application 310 that includes entry types in which translatable language text is distinguished from parameters for the purposes of language substitution for localization of the application 310.

The reference component 322 may use an indexing component 323 for reading and indexing the localization language resource 210 for accelerated identifying of entry types corresponding to log entries.

The parameter value identifying component 320 may include an entry type component 324 for identifying an entry type in the localization language resource 210 that corresponds to a received log entry. The entry type component 324 may uses logic matching to match the language text of the log entry to the translatable language text of an entry type in the localization language resource. Where a log entry has an entry key, the entry type component 324 may look up the entry key of the log entry.

The parameter value identifying component 320 may include a parameter distinguishing component 325 for analyzing the log entry with reference to the entry type to distinguish the parameter values from the translatable language text.

The parameter value identifying component 320 may include an extractor component 326 for extracting the parameter values from the log entry for analysis. The localization language resource 210 may include indications of parameter names of the parameters and the extractor component 326 for extracting the parameter values from the log entry for analysis may include a parameter name component 327 for associating the parameter names with the parameter values.

The parameter value identifying component 320 may include a log processing component 328 for processing the extracted parameter values. In one embodiment, a side log component 329 may be provided for capturing the parameter values in a side log of the log file 260 using line numbers of the log file 260 as a positional index for the parameter values.

Figure 4:
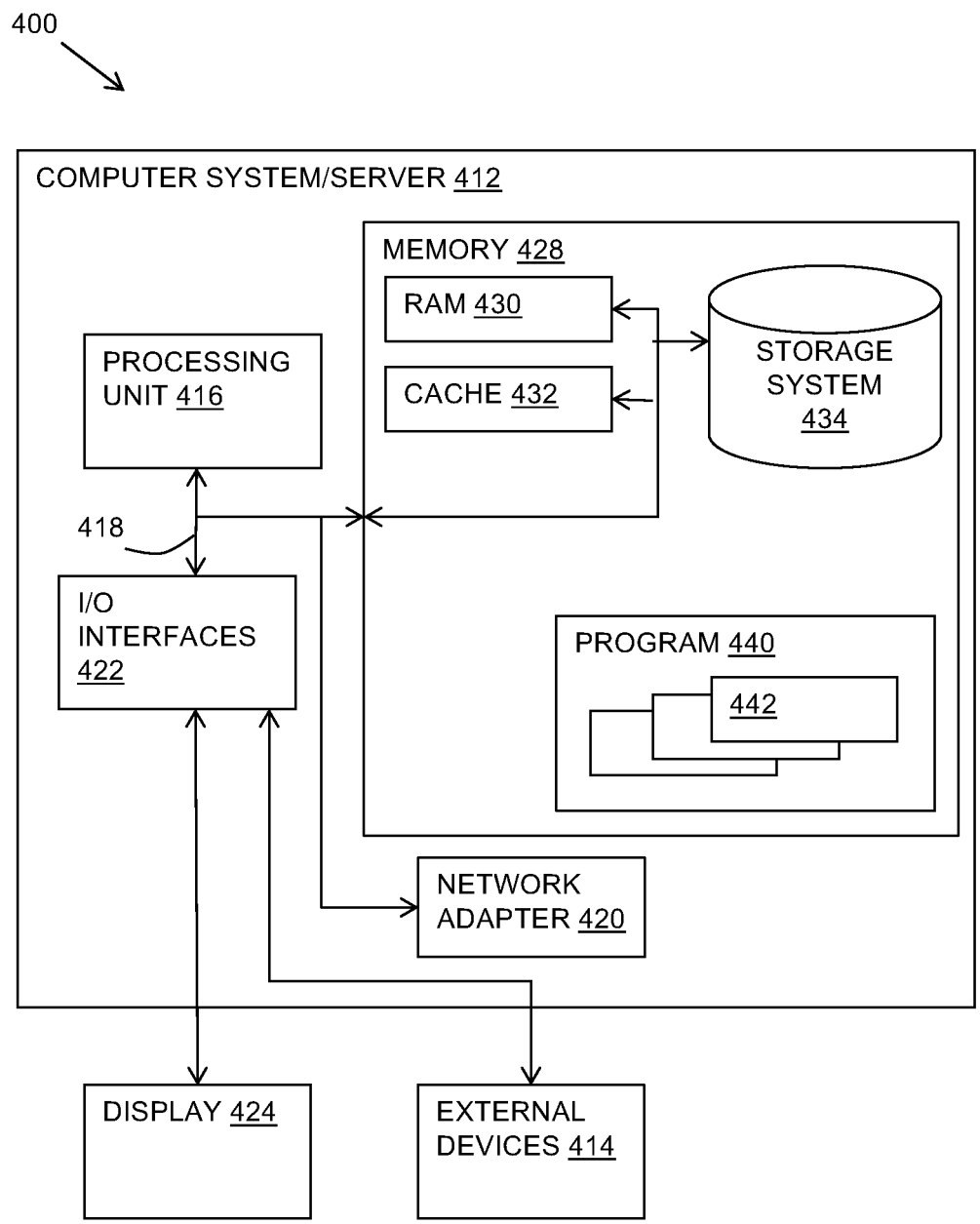
FIG. 4 is a block diagram of an embodiment of a computer system or cloud server in which the present invention may be implemented.

Referring now to FIG. 4, a schematic of an example of a system 400 in the form of a computer system or server is shown.

A computer system or server 412 may be operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

In FIG. 4, a computer system/server 412 is shown in the form of a general-purpose computing device. The components of the computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing:

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
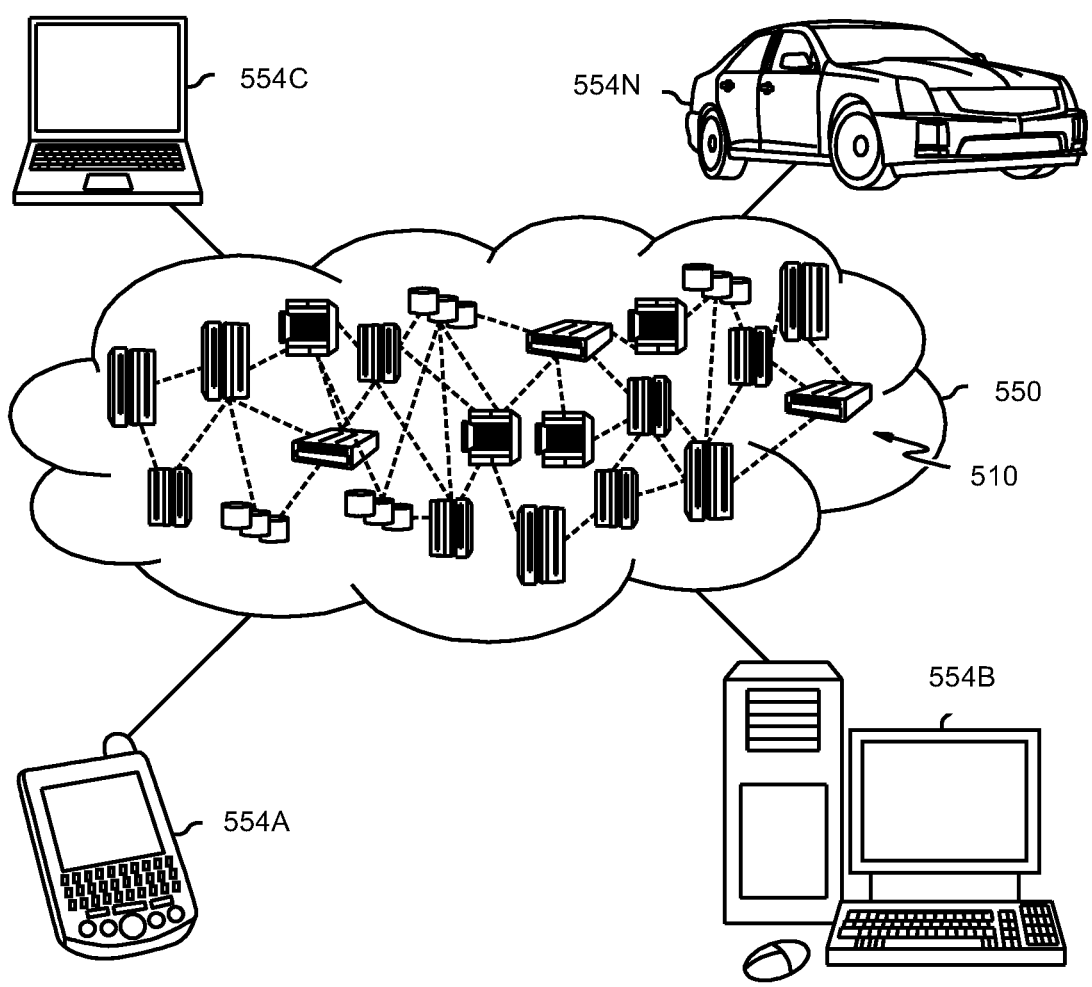
FIG. 5 is a schematic diagram of a cloud computing environment in which the present invention may be implemented.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
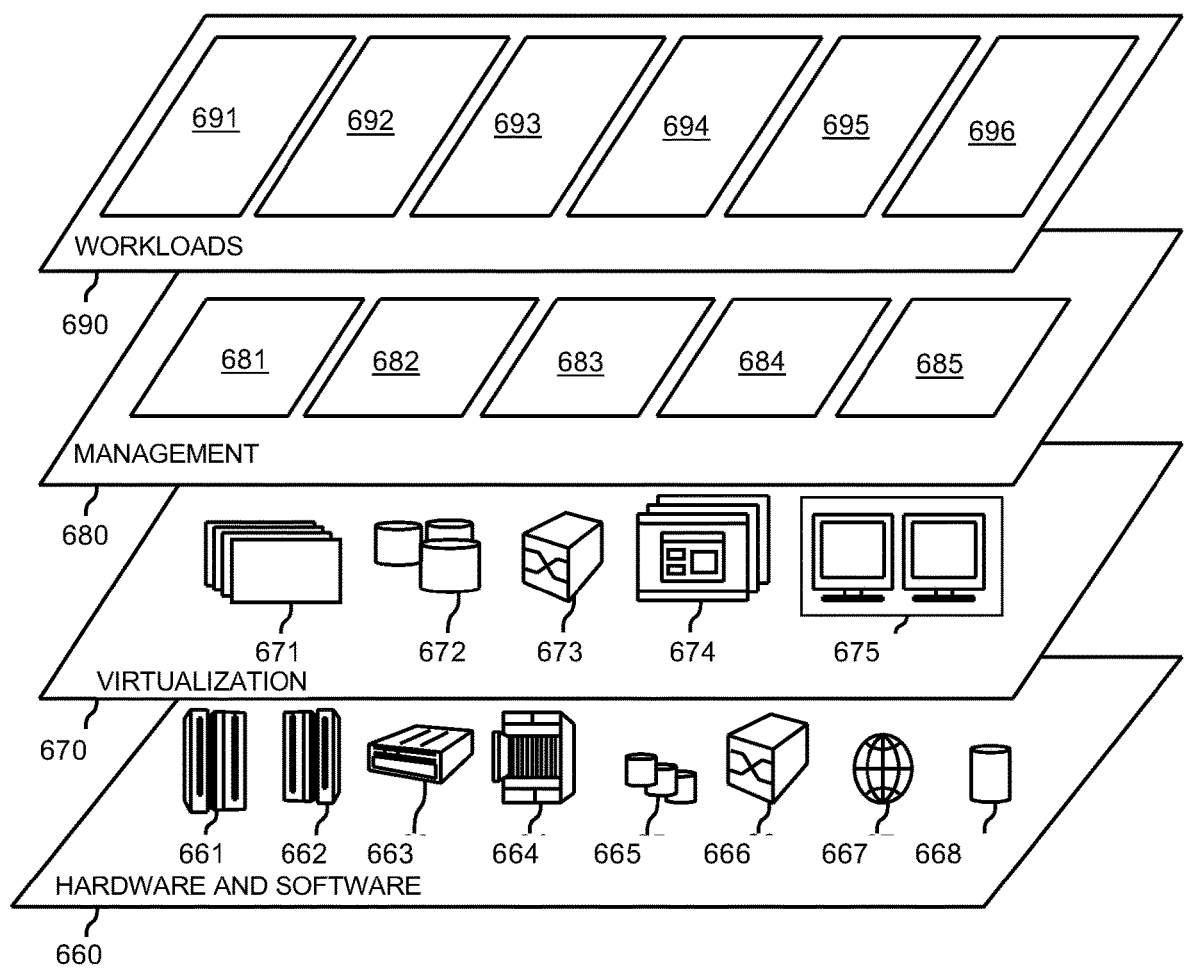
FIG. 6 is a diagram of abstraction model layers of a cloud computing environment in which the present invention may be implemented.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and processing log entries 696 including identifying parameter values in log entries.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for identifying parameter values in log entries of an application, comprising:

receiving a log entry including language text and parameter values;

referencing a localization language resource of the application that includes entry types in which translatable language text is distinguished from parameters for the purposes of language substitution for localization of the application;

identifying an entry type in the localization language resource that corresponds to the log entry, wherein identifying an entry type in the localization language resource that corresponds to the log entry uses matching logic to match the language text of the log entry to the translatable language text of an entry type in the localization language resource;

analyzing the log entry with reference to the entry type to distinguish the parameter values from the translatable language text; and extracting the parameter values from the log entry for analysis.

2. The method as claimed in claim 1, wherein the localization language resource includes indications of parameter names of the parameters, and extracting the parameter values from the log entry for analysis includes associating the parameter names with the parameter values.

3. The method as claimed in claim 1, further comprising processing the extracted parameter values.

4. The method as claimed in claim 1, further comprising carrying out the method for multiple log entries in a log file for analysis of parameter values in the log file.

5. The method as claimed in claim 4, further comprising capturing the parameter values in a side log using line numbers of the log file as a positional index for the parameter values.

6. The method as claimed in claim 1, further comprising reading and indexing the localization language resource for accelerated identifying of entry types corresponding to log entries.

7. The method as claimed in claim 1, wherein a log entry has an entry key and identifying an entry type in the localization language resource looks up the entry key of the log entry.

8. The method as claimed in claim 1, wherein the method is carried out as a log file is written or retrospectively to an existing log file.

9. The method as claimed in claim 1, wherein the method is carried out as a cloud service.

10. A system for identifying parameter values in log entries of an application, comprising:

a processor and a memory configured to provide computer program instructions to the processor to execute the function of components of the system;

a log entry input component for receiving a log entry including language text and parameter values;

a reference component for referencing a localization language resource of the application that includes entry types in which translatable language text is distinguished from parameters for the purposes of language substitution for localization of the application;

an entry type component for identifying an entry type in the localization language resource that corresponds to the log entry, wherein identifying an entry type in the localization language resource that corresponds to the log entry uses matching logic to match the language text of the log entry to the translatable language text of an entry type in the localization language resource;

a parameter distinguishing component for analyzing the log entry with reference to the entry type to distinguish the parameter values from the translatable language text; and an extractor component for extracting the parameter values from the log entry for analysis.

11. The system as claimed in claim 10, wherein the localization language resource includes indications of parameter names of the parameters, and the extractor component for extracting the parameter values from the log entry for analysis includes a parameter name component for associating the parameter names with the parameter values.

12. The system as claimed in claim 10, including a log processing component for processing the extracted parameter values.

13. The system as claimed in claim 10, wherein the log entry input component receives multiple log entries of a log file for analysis of parameter values in the log file.

14. The system as claimed in claim 13, including a side log component for capturing the parameter values in a side log using line numbers of the log file as a positional index for the parameter values.

15. The system as claimed in claim 10, including an indexing component for reading and indexing the localization language resource for accelerated identifying of entry types corresponding to log entries.

16. The system as claimed in claim 10, wherein a log entry has an entry key and the entry type component for identifying an entry type in the localization language resource looks up the entry key of the log entry.

17. The system as claimed in claim 10, wherein the system processes a log file as it is written or is applied retrospectively to an existing log file.

18. A computer program product for identifying parameter values in log entries, the computer program product comprising a computer readable storage medium having program instructions embodied therewith, the program instructions executable by a processor to cause the processor to:

receive a log entry including language text and parameter values;

reference a localization language resource of the application that includes entry types in which translatable language text is distinguished from parameters for the purposes of language substitution for localization of the application;

identify an entry type in the localization language resource that corresponds to the log entry, wherein identifying an entry type in the localization language resource that corresponds to the log entry uses matching logic to match the language text of the log entry to the translatable language text of an entry type in the localization language resource;

analyze the log entry with reference to the entry type to distinguish the parameter values from the translatable language text; and extract the parameter values from the log entry for analysis.

* * * * *